United States Patent [19]

Nakagawa

[11] 3,810,222

[45] May 7, 1974

[54] SWITCHING DEVICE FOR ELECTRONIC SHUTTER

[75] Inventor: Tadashi Nakagawa, Chiba, Japan

[73] Assignee: Seiko Koki Kabushiki Kaisha, Chuo-ku, Tokyo, Japan

[22] Filed: Nov. 6, 1972

[21] Appl. No.: 303,687

[52] U.S. Cl. .................................. 95/53 E, 95/53 EB
[51] Int. Cl. .............................................. G03b 9/60
[58] Field of Search............ 95/53 E, 53 EB, 10 CT

[56] References Cited
UNITED STATES PATENTS
3,425,329  2/1969  Starp............................. 95/53 EB
FOREIGN PATENTS OR APPLICATIONS
1,158,691  7/1969  Great Britain.................... 95/53 EB Primary Examiner—Samuel S. Matthews
Assistant Examiner—Russell E. Adams, Jr.
Attorney, Agent, or Firm—Robert E. Burns; Emmanuel J. Lobato

[57] ABSTRACT

A camera having an electronic shutter whose exposure time is controlled by a control circuit is provided with a switching device having a first switching state wherein same disconnects an electric power source from the control circuit and a second switching state wherein same connects the electric power source to the control circuit. A switch-actuating lever responds to movement of a shutter release lever to switch the switching device from its first switching state to its second switching state. A biasing spring coacts with the switch-actuating lever to maintain same in a position wherein the switching device is in its first switching state and the biasing spring is compressed in response to movement of the switch-actuating lever into a position wherein same shifts the switching device into its second switching state. The spring energy stored in the biasing spring is then released during movement of the shutter to its open position and the switching device is thereafter maintained in its second switching state independently of the position of the release lever and by the coaction between the switch-actuating lever and the switching device.

8 Claims, 6 Drawing Figures

SWITCHING DEVICE FOR ELECTRONIC SHUTTER

The present invention relates generally to cameras having electronic shutters and more particularly, relates to a device for maintaining the control circuitry of the camera in an energized state throughout the exposure operation.

Cameras employing electronic shutters are well-known in the art and such cameras usually having an electromagnet energized by an electronic control circuit for automatically controlling the exposure time. A switch is normally provided to open and close the control circuit in response to opening of the shutter and therefore some means must be employed to maintain the switch in a closed position until completion of the exposure. In instances when the exposure time is comparatively long, for example, longer than one second, this problem becomes quite serious and many attempts have been made to provide devices for maintaining the switch in its closed position.

One technique employed in the prior art is to connect the switch to the shutter release lever so that the switch is maintained in a closed position for as long as the shutter release lever is depressed. This technique is undesirable since the shutter release lever must be continuously depressed by the operator during the entire opening and closing movement of the shutter or else the control circuit will be rendered ineffective to control the exposure timing.

Another technique employed in the prior art is to actuate the switch in response to depression of the shutter release lever and to provide some means for maintaining the release lever in its depressed state until completion of the exposure. This technique is disadvantageous since it requires an additional mechanism for releasably engaging with the release lever. In addition, this technique is only suitable in cameras wherein the release lever is easily depressed but does not work well where a considerable force must be exerted upon the release lever. Consequently, this technique is undesirable for use in cameras wherein the shutter is automatically charged or cocked during return movement of the release lever since in these cameras, a larger force is required to actuate the release lever.

A third technique employed in the prior art is to actuate the switch in response to depression of the shutter release lever and to engage the release lever with a driving member used to open the shutter so that the release lever is maintained in its depressed position by the driving member. Then during closing of the shutter, the driving member disengages from the release lever enabling same to return back to its initial position. This technique is disadvantageous since additional mechanisms must be employed to effect engagement of the driving member with the release lever. In addition, a separate switch is usually used to maintain the control circuit energized once the shutter is in the open position and therefore problems are encountered in manufacturing the camera to accurately position both switches so that they may be correctly actuated.

It is therefore a primary object of the present invention to provide a camera having an electronic shutter which overcomes the aforementioned disadvantages.

It is another object of the present invention to provide a camera having an electronic shutter controlled by a control circuit and having a switching device for connecting the control circuit to an electric power source throughout the exposure independently of the position of both the shutter release lever and the shutter-actuating means.

It is a still further object of the present invention to provide a camera having an electronic shutter and having a switching device actuated in response to movement of a release lever to render effective a control circuit for controlling the exposure time and which switching device is of simple construction.

The above and other objects of the present invention are carried out by providing a switching device having a first switching state wherein same disconnectes an electric power source from a control circuit and a second switching state wherein same connects the electric power source to the control circuit, and a switch-actuating lever responsive to movement of a shutter release lever to shift the switching device from its first switching state to its second switching state. A biasing spring coacts with the switch-actuating lever to maintain same in a position wherein the switching device is in its first switching state and the biasing spring is compressed in response to movement of the switch-actuating lever into a position wherein same shifts the switching device into its second switching state. The spring energy stored in the biasing spring is then released during movement of the shutter to its open position and the switching device is thereafter maintained in its second switching state independently of the position of the release lever and by the coaction between the switch-actuating lever and the switching device.

Having in mind the above and other objects that will be evident from an understanding of this disclosure, the present invention comprises the combinations and arrangements of parts as illustrated in the presently preferred embodiments of the invention which are hereinafter set forth in sufficient detail to enable those persons skilled in the art to clearly understand the function, operation, construction and advantages of it when read in conjunction with the accompanying drawings, wherein like reference characters denote like parts in the various views, and wherein.

Figure 1:
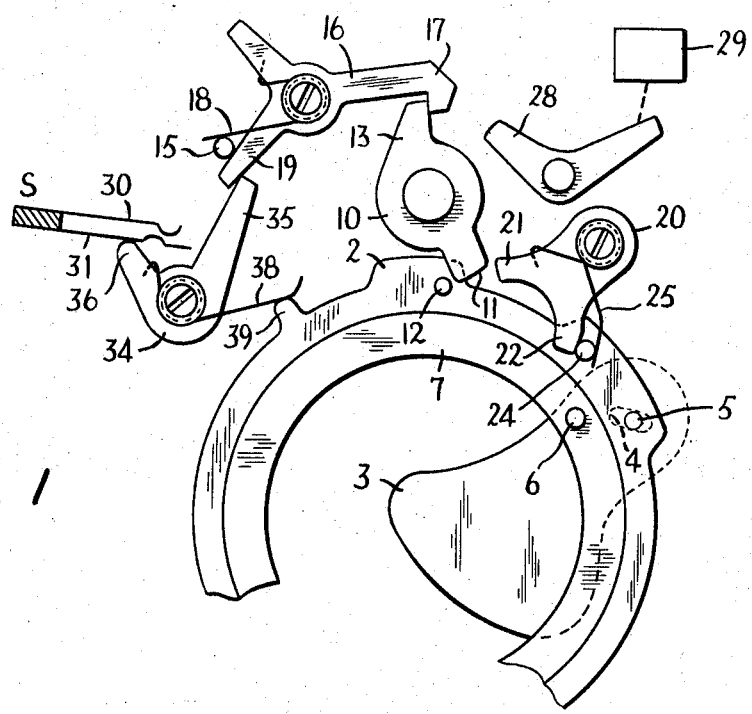
FIG. 1 is schematic view of one embodiment of the invention illustrating the position of the camera components when the shutter is in the charged state.

One embodiment of the invention is shown in FIGS. 1 – 4 which show various working positions assumed by the camera components during one cycle of camera operation. As seen in FIG. 1, the camera includes a shutter comprising an opening-and-closing ring 2 mounted for angular movement to effect opening and closing movement of a shutter blade 3. The blade 3 is provided with a slot 4 and a pin 5 affixed to the ring 2 slidably extends through the slot 4 to form a pin-and-slot connection. The blade 3 is also pivotally mounted upon a pin 6 connected to a fixed ring 7 and by such a construction, counterclockwise movement of the ring 2 effects pivotal movement of the blade 3 in a counterclockwise direction about the pin 6 to open the shutter whereas clockwise movement of the ring 2 effects a corresponding clockwise pivotal movement of the blade 3 to close the shutter.

A drive lever 10 is pivotally mounted adjacent the ring 2 and the lever 10 is constantly biased by a drive spring (not shown) to undergo clockwise pivotal movement. The drive lever 10 has a driving arm 11 engageable with an opening pin 12 affixed to the ring 2 and a locking arm 13.

A release lever 16 releasably locks the drive lever 10 in the position shown in FIG. 1 corresponding to the charged or cocked state of the shutter. The release lever 16 is mounted for turning movement and has a locking arm 17 engageable with the locking arm 13. A biasing spring 18 coacts with a stationary pin 15 to bias the lever 16 in a counterclockwise direction to the position shown in FIG. 1 wherein the release lever 16 releasably engages with the drive lever 10. The lever 16 also has an arm 19 for initiating the actuation of the switching means, as described hereinafter.

A return lever 20 coacts with the drive lever 10 to return the shutter blade 3 to its closed position. The lever 20 is mounted for pivotal turning movement and includes a transfer arm 21 and a driving arm 22 engageable with a closing pin 24 affixed to the open-and-closing ring 2. A biasing spring 25 engages with the pin 24 and continuously biases the return lever in a counterclockwise direction to maintain the driving arm 22 in contact with the pin 24.

A hook lever 28 is pivotally mounted for pivotal movement into and out of the path of travel of the drive lever 10 and releasably engages or hooks with the drive lever 10 to maintain the shutter in its open position for a time duration determined by a control circuit 29. The control circuit 29 is of conventional construction and includes an electromagnet which is selectively energized to control the movement of the hook lever 28 through a mechanical linkage (shown in dashed lines). The control circuit 29 alternately positions the hook lever 28 in the position depicted in FIGS. 1–3 wherein same engages with the drive lever 10 to maintain the shutter open for the desired time duration and in the position depicted in FIG. 4 wherein same does not engage with the drive lever 10 thereby enabling the drive lever to drive the shutter closed.

The control circuit 29 is rendered effective to control the exposure timing by a switching assembly which connects and disconnects the control circuit from an electric power source (not shown), such as a battery. The switching assembly comprises a normally open switch S having a stationary switch contact 30 and a movable switch contact 31 normally spaced-apart from the stationary contact 30. The switch contacts 30 and 31 are connected in series with the control circuit 29 and the electric power source so that when the switch S is open, the power source is disconnected from the control circuit and the latter is ineffective to control the exposure timing whereas when the switch S is closed, the power source is connected to the control circuit and the latter is thereby rendered effective to control the exposure timing.

The switching assembly includes a switch-actuating lever 34 mounted for pivotal turning movement between a switch-open position and a switch-closed position. The lever 34 has an arm 35 engageable with the arm 19 of the release lever 16 and an actuating arm 36 engageable with the movable contact 31 to actuate same into switching contact with the stationary contact 30. A biasing spring 38 biases the lever 34 in a counterclockwise direction into the switch-open position thereby maintaining the switch S in its open position in dependence upon the combined positions of the opening-and-closing ring 2 and the release lever 16. The biasing spring 38 biases the lever 34 in a counterclock direction only when the opening-and-closing ring 2 occupies a position wherein the projection 39 engages with the baising spring during the time the release lever 16 is not driving the lever 34 in a clockwise direction. This condition of the biasing spring 38 is shown in FIG. 1 which shows the camera in a charged state in readiness to begin an exposure and in FIG. 4 which shows the camera at the completion of an exposure.

Figure 2:
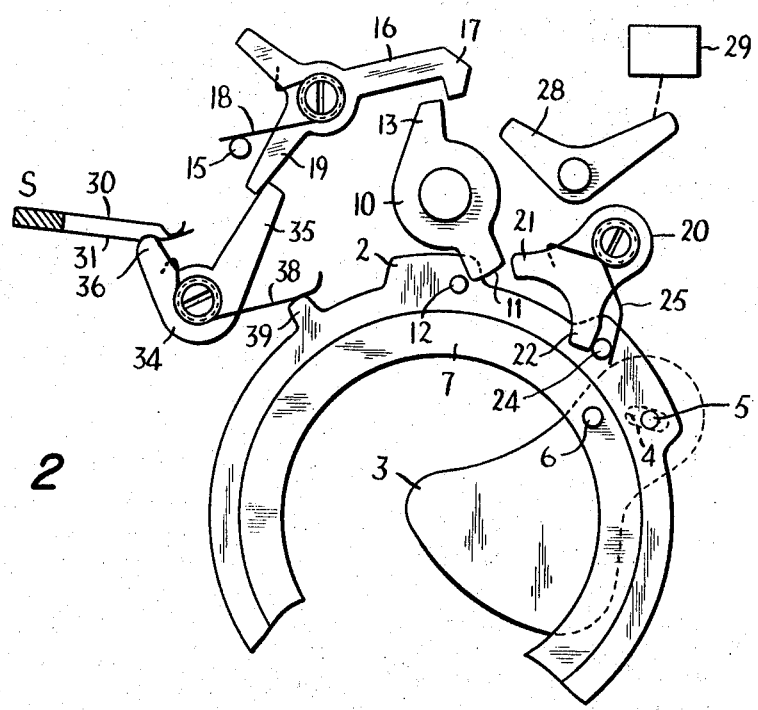
FIG. 2 is a schematic view of the embodiment shown in FIG. 1 and showing the positions of the camera components at the instant the release lever is depressed.
Figure 3:
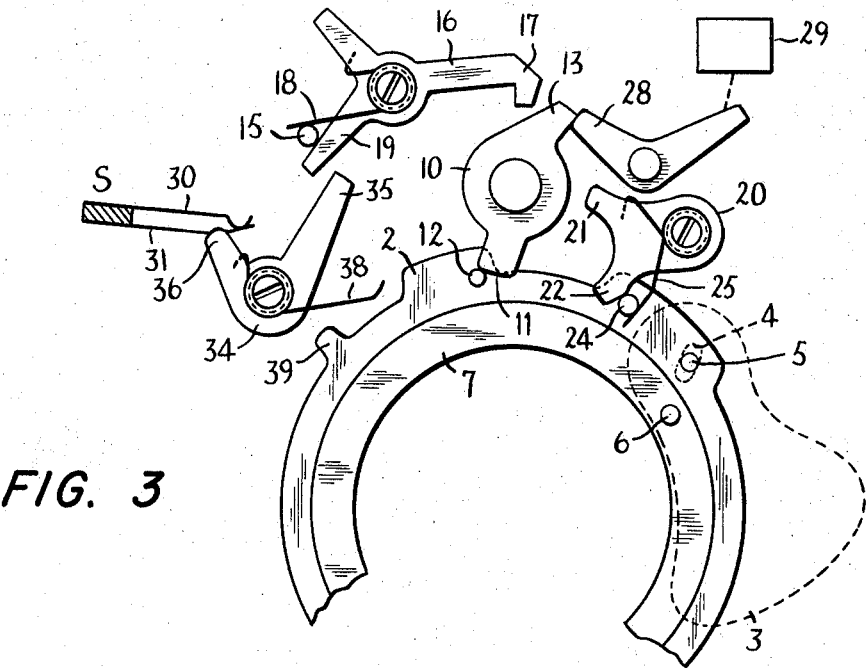
FIG. 3 is a schematic view of the embodiment shown in FIG. 2 showing the position of the camera components when the shutter is fully opened.

In order to facilitate the maintaining of the switch S in the closed position, the movable contact 31 has a small, indented portion configured to receive therein and engage with the end tip of the actuating arm 36, as shown in FIGS. 2 and 3. The indented portion coacts with the arm 36 to releasably hold the latter therein to thereby maintain the switch S in the closed position despite movement of the projection 39 away from and out of engagement with the biasing spring 38.

The operation of the embodiment shown in FIGS. 1 – 4 will now be described starting with FIG. 1 which shows the camera in the charged state in readiness to effect an exposure. In this condition, the biasing spring 38 biases the switch S into its open position and the control circuit 29 is disconnected from the power source and therefore is ineffective to control the exposure timing.

The release lever 16 is then displaced in a counterclockwise direction against the biasing force of the spring 18 causing the arm 19 to push against the arm 35 and pivotally drive the switch-actuating lever 34 in a clockwise direction. In response to such movement of the lever 34, the actuating arm 36 moves the movable switch contact 31 into contact with the stationary contact 30 thereby closing the switch S to energize the control circuit 29 and the arm 36 engages in the indented portion of the contact 31. During the movement of the switch-actuating lever 34, the biasing spring 38 is compressed between the projection 39 and the arm 36 and the compressive spring energy is temporarily stored in the spring as potential energy tending to restore the lever 34 back to its initial position.

Further movement of the release lever 16 in the counterclockwise direction causes the locking arm 17 to disengage from the locking arm 13 of the drive lever 10 thereby freeing the drive lever 10 for movement and the position of the components at this moment is shown in FIG. 2. The drive lever 10 is then driven in a clockwise direction by the drive spring (not shown) causing the driving arm 11 to engage with the opening pin 12 and actuate the opening-and-closing ring 2 in a counterclockwise direction to effect opening of the shutter.

During such movement of the ring 2, the control circuit 29 is triggered in a well-known manner to automatically control the exposure timing.

The ring 2 is driven by the drive lever 10 to the full shutter open position and this condition is shown in FIG. 3. At this time, the locking arm 13 abuts against the hook lever 28 which is held in position under control of the electromagnet of the control circuit 29. During movement of the ring 2 to the position shown in FIG. 3, the projection 39 is moved out of engagement with the biasing spring 38 whereupon the potential energy of compression stored in the spring is released and the spring flexes back to its original shape. It should be noted that the spring 38 remains engaged with the movable contact 31 thereby maintaining the switch S closed while the stored energy of compression is being dissipated and such occurs irrespective of the position of the release lever 16. Thus the release lever may be released and returned to its initial position by the biasing spring 18 and such has no affect upon maintaining the switch S closed.

Figure 4:
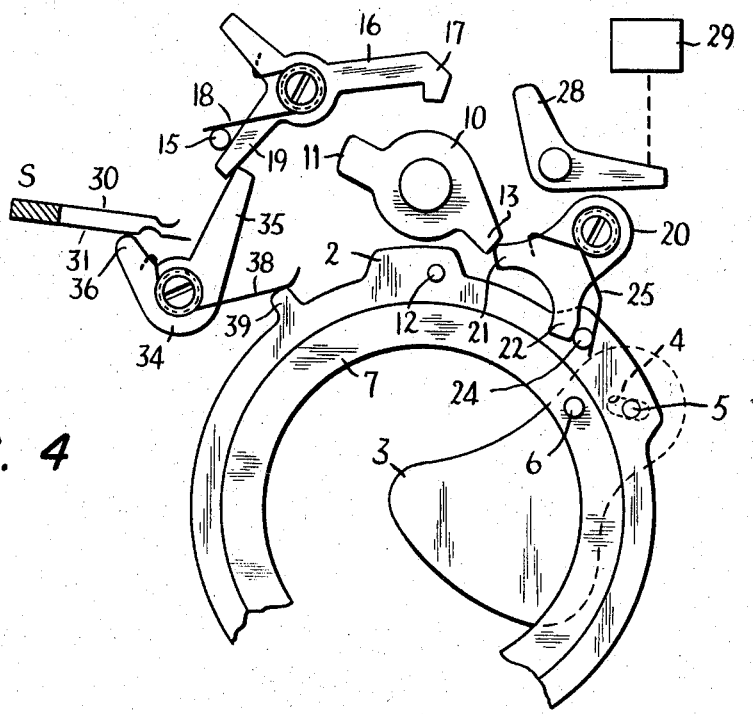
FIG. 4 is a schematic view of the embodiment illustrated in FIG. 3 and showing the position of the camera components when the shutter is closed at the completion of the exposure.

After the desired exposure time has elapsed, the control circuit 29 energizes the electromagnet to pivot the hook lever 28 in a clockwise direction out of engagement with the drive lever 10 thereby freeing same for further movement. The drive lever then continues to move in the clockwise direction causing the arm 13 to engage with the transfer arm 21 of the return lever 20 and the drive lever 10 then drives the return lever in a counterclockwise direction. The driving arm 22 engages with the closing pin 24 and drives same in a counterclockwise direction thereby effecting closing of the shutter, as shown in FIG. 4.

During return movement of the ring 2 in the clockwise direction, the projection 39 engages with the biasing spring 38 and accordingly drives the switch-actuating lever 34 in a counterclockwise direction into the switch-open position wherein the actuating arm 36 is disengaged from the movable contact 31 thereby opening the switch S. When the switch S opens, the power to the control circuit 29 is terminated and the latter is rendered ineffective to control the exposure timing until again connected to the power source.

Figure 5:
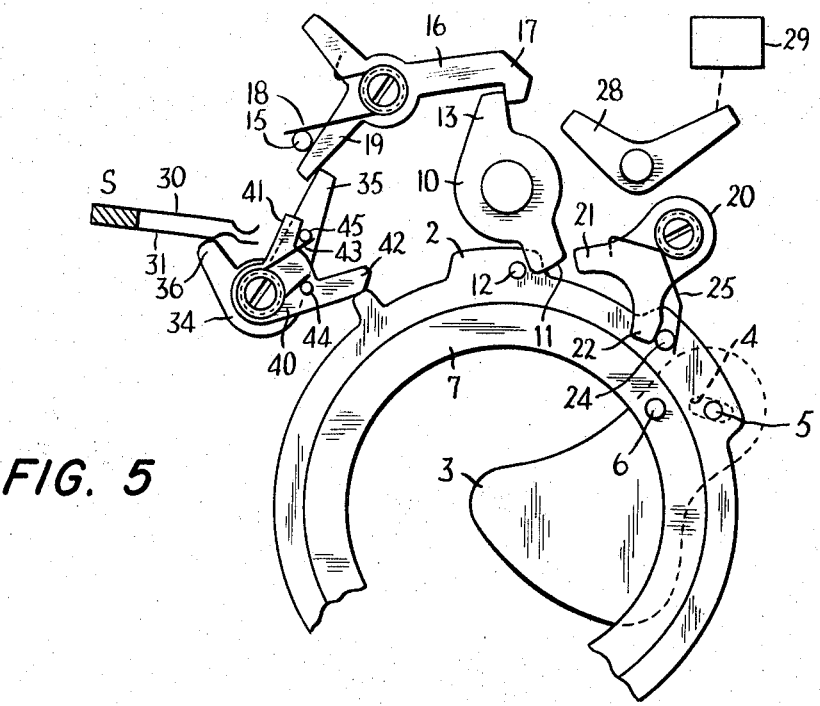
FIG. 5 is a schematic view of a second embodiment of the invention illustrating the position of the camera components when the shutter is in a charged state.

A second embodiment of the present invention is shown in FIG. 5 and in this embodiment, a transfer lever 40 coacts with the switch-actuating lever 34 to effect dissipation of the compressive spring energy stored in the biasing spring. The lever 40 is mounted for pivotal movement coaxially with the lever 34 and has a pair of arms 41 and 42 projecting outwardly therefrom in a diverging direction. A pin 44 is affixed to the lever 40 and a pin 45 is affixed to the arm 35 of the lever 34. A biasing spring 48 is compressed between the pins 44 and 45 and functions in a manner similar to that of the biasing spring 38 in FIGS. 1 - 4.

During operation of the second embodiment, actuation of the release lever 16 in a counterclockwise direction causes the arm 19 to engage with and pivotally drive the switch-actuating lever 34 in a clockwise direction to effect closure of the switch S. As the lever 34 moves in a clockwise direction, the pin 45 is moved closer to the pin 44 thereby compressing the spring 48 and placing same in a condition to return the lever 34 back to its original position. Then, as the ring 2 is driven in a counterclockwise direction to effect a shutter opening, the projection 39 disengages from the arm 42 whereupon the potential energy stored in the spring 48 is expended by pivotally driving the transfer lever 40 in a clockwise direction until the arm 41 abuts against the pin 45.

By such a construction, the switch-actuating lever 34 is maintained in the indented portion of the movable contact 31 and the switch S remains closed until the ring 2 commences its return movement and the projection 39 again engages with the lever 34. Thus the potential energy stored in the compressed biasing spring 48 is dissipated while the switch S is maintained closed and irrespective of the return movement of the release lever 16 back to its initial starting position.

Figure 6:
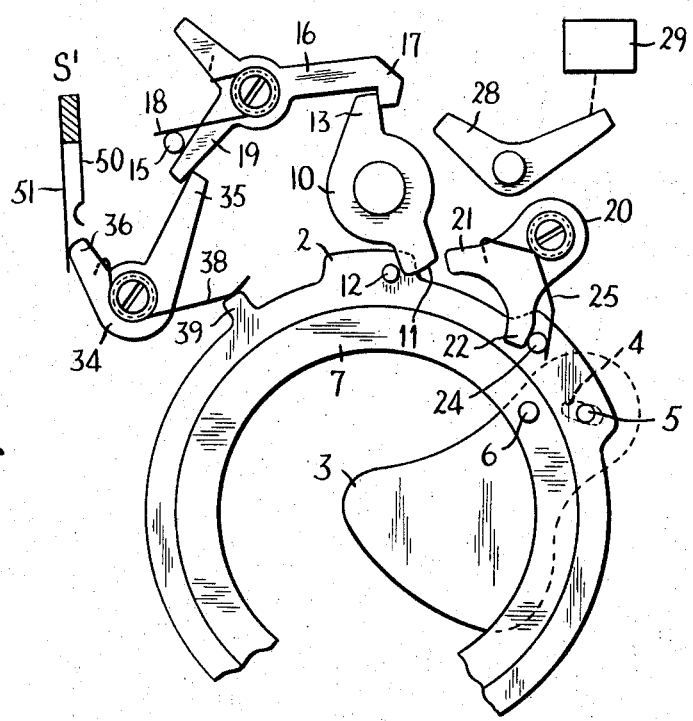
FIG. 6 is a schematic view showing a third embodiment of the invention and showing the positions of the camera components when the shutter is in a charged state.

A third embodiment of the invetnion is shown in FIG. 6 and this embodiment is identical to the embodiment shown in FIGS. 1 - 4 except that the switch S' is of the normally closed type. The switch S' has a stationary switching contact 50 and a movable switching contact 51 normally in switching contact with the contact 50 to effect energization of the control circuit 29 to render same effective to automatically control the exposure timing.

The switch-actuating lever 34 biases the movable contact 51 out of engagement with the stationary contact 50 when the ring 2 is in the position shown in FIG. 6 corresponding to the time that the shutter is closed. When the release lever 16 is pivoted in a counterclockwise direction, the arm 18 engages with the arm 35 and drives the lever 34 in a clockwise direction to close the switch S' and compress the biasing spring 38. Then during movement of the ring 2 in a counterclockwise direction, the projection 39 disengages from the spring 38 whereupon the compressive spring energy stored in the spring is released while the switch S' is maintained closed and independently of the position of the release lever 16.

In all of the disclosed embodiments, the biasing spring in the switching assembly is actuated by engaging and disengaging with a projection 39 on the opening-and-closing ring 2 and it is understood that the biasing spring may be actuated by engaging with another part which is movable in synchronization with the finishing of an exposure. It is also possible to use the switch S as a trigger switch as well through an interlock mechanism as well known in the art.

What I claim is:

1. In a camera having an electronic shutter and a control circuit for controlling the exposure time of said shutter: a movable release lever; switching means connected to said control circuit and switchable into a first switching state wherein same renders said control circuit ineffective to control the exposure time and switchable into a second switching state wherein same renders said control circuit effective to control the exposure time; switch-actuating means movable to one position wherein same maintains said switching means in said first switching state and movable to another position in response to initial movement of said release lever in a given direction wherein same maintains said switching means in said second switching state; biasing means for resiliently biasing said switch-actuating means into said one position and compressible to store spring energy therein in response to movement of said switch-actuating means from said one position to said another position; and shutter-actuating means mounted in said camera for movement independently of said switch-actuating means and responsive to further movement of said release lever in said direction for opening said shutter and effecting release of all the stored spring energy in said biasing means during the opening movement of said shutter and for closing said shutter and coacting with said biasing means during the closing movement of said shutter to effect movement of said switch-actuating means back into said one position.

2. A camera according to claim 1; wherein said switch-actuating means comprises a pivotal lever engageable with said release lever during initial movement thereof in said given direction to switch said switching means from said first switching state to said second switching state.

3. A camera according to claim 1; wherein said switching means comprises a normally open switch having a stationary contact, and a movable contact normally spaced-apart from said stationary contact thereby defining said first switching state and movable by said switch-actuating means into contact with said stationary contact thereby defining said second switching state.

4. A camera according to claim 1; wherein said switching means comprises a normally closed switch having a stationary contact, and a movable contact normally contacting said stationary contact thereby defining said second switching state and movable out of contact with said stationary contact thereby defining said first switching state by said switch-actuating means when same is in said one position.

5. A camera according to claim 1; wherein said biasing means comprises a biasing spring engageable with said shutter-actuating means when said shutter is in a closed position for biasing said switch-actuating means into said one position and disengageable from said shutter-actuating means during opening and closing movement of said shutter to enable release of the energy stored therein during movement of said switch-actuating means from said one position to said another position.

6. A camera according to claim 1; wherein said switch-actuating means comprises a pivotal lever engageable with said release lever during initial movement thereof in said given direction to switch said switching means from said first switching state to said second switching state; and wherein said biasing means comprises a biasing spring engageable with said shutter-actuating means when said shutter is in a closed position for biasing said lever into said one position and disengageable from said shutter-actuating means during opening and closing movement of said shutter to enable release of the energy stored therein during movement of said lever from said one position to said another position.

7. A camera according to claim 1; wherein said shutter-actuating means includes a movable open-and-closing ring movable in one direction to effect opening of said shutter and movable in another direction to effect closing of said shutter, and a projection on said ring engageable with said biasing means when said shutter is in a closed position to enable said biasing means to be compressed in response to movement of said switch-actuating means from said one position to said another position.

8. A camera according to claim 1; wherein said switch-actuating means comprises a first pivotal lever engageable with both said switching means and said release lever to switch said switching means from said first switching state to said second switching state in response to initial movement of said release lever in said given direction, and a second pivotal lever engageable with said first pivotal lever and said shutter-actuating means; and wherein said biasing means comprises a biasing spring interposed between said first and second levers.

* * * * *